(12) United States Patent
Luttrell

(10) Patent No.: US 6,202,754 B1
(45) Date of Patent: Mar. 20, 2001

US006202754B1

(54) HORSESHOE CLEANING TOOL AND METHOD OF USING

(76) Inventor: James R. Luttrell, 6205 Old Getwell Rd., Southaven, MS (US) 38671

( * ) Notice: Subject to any disclaimer, the term of this patent is extended or adjusted under 35 U.S.C. 154(b) by 0 days.

(21) Appl. No.: 09/339,414

(22) Filed: Jun. 24, 1999

(51) Int. Cl.⁷ .............................. A01L 11/00; A47L 13/08
(52) U.S. Cl. .................... 168/48.1; 15/236.07; 30/169
(58) Field of Search ........................... 168/48.1, 45, 47, 168/46; 15/237, 236.07, 236.01; 30/169

(56) References Cited

U.S. PATENT DOCUMENTS

| | | | |
|---|---|---|---|
| 37,000 | * 11/1862 | Kelly et al. ........................ 168/48.1 |
| 544,540 | 8/1895 | Jones . | |
| 547,703 | 10/1895 | Wilbanks . | |
| 567,493 | 9/1896 | McCartea . | |
| 587,873 | * 8/1897 | Sisson ................................ 30/169 |
| 701,503 | * 6/1902 | Plummer ............................ 30/169 |
| 816,733 | * 4/1906 | McDonald ........................ 168/48.1 |
| 1,473,143 | * 11/1923 | Dean ............................... 15/236.01 |
| 2,264,374 | * 12/1941 | Henschell ........................... 30/169 |
| 2,787,395 | * 4/1957 | Florio ................................ 215/392 |
| 2,824,323 | * 2/1958 | Tos et al. ............................ 15/105 |
| 2,827,697 | * 3/1958 | Woodel .............................. 30/293 |
| 3,224,091 | * 12/1965 | Scigliano ........................... 30/142 |
| 4,187,607 | 2/1980 | Simuro et al. ..................... 30/152 |
| 4,248,660 | * 2/1981 | Johnson ............................ 156/579 |
| 4,367,798 | 1/1983 | Sabol ................................. 168/45 |
| 5,095,573 | * 3/1992 | Henke et al. ....................... 15/105 |
| 5,176,222 | 1/1993 | Tippin ............................. 168/48.1 |
| 5,251,352 | * 10/1993 | Cullison ............................. 7/105 |
| 5,337,442 | * 8/1994 | Stewart ........................... 15/236.01 |
| 5,392,484 | * 2/1995 | Stoltzfus ........................... 15/235.7 |
| 5,575,337 | 11/1996 | Sapyta ............................. 168/48.1 |
| 5,636,697 | 6/1997 | Pitchford ......................... 168/48.1 |
| 5,694,660 | * 12/1997 | Rachwalski ......................... 15/237 |
| 6,000,137 | * 12/1999 | Gamba .............................. 30/169 |

* cited by examiner

Primary Examiner—Peter M. Poon
Assistant Examiner—James S. Bergin
(74) Attorney, Agent, or Firm—Walker, McKenzie & Walker, P.C.

(57) ABSTRACT

A horseshoe cleaning tool and method for cleaning under a horseshoe shod to a horse's hoof. The tool includes a blade portion having a blade neck with proximal and distal ends, and the blade portion has a substantially thin and planar tip portion adjacent the blade neck distal end. The tip portion has left and right wing-type extensions each extending laterally outward within the plane of the tip portion and respectively having a left and a right pointed tip remote from the blade neck. The left and right wing-type extensions respectively form left and right notches of about 90 degrees adjacent the blade neck distal end, and the tip portion is substantially rounded intermediate the left and right pointed tips. The tool has a handle grip spaced from the plane of the tip portion, and a blade mounting segment extends upwardly and rearwardly from the blade neck's proximal end and joins to the handle grip. The method comprises grasping the handle grip with a hand, raising the horse's hoof above the ground so that the horse's hoof no longer supports the horse, then placing the tip portion of the tool under the horseshoe and between the horseshoe and the horse's hoof, and then moving the handle grip from side to side and forcing debris from under the horseshoe by using the wing-type extensions to engage the debris.

8 Claims, 1 Drawing Sheet

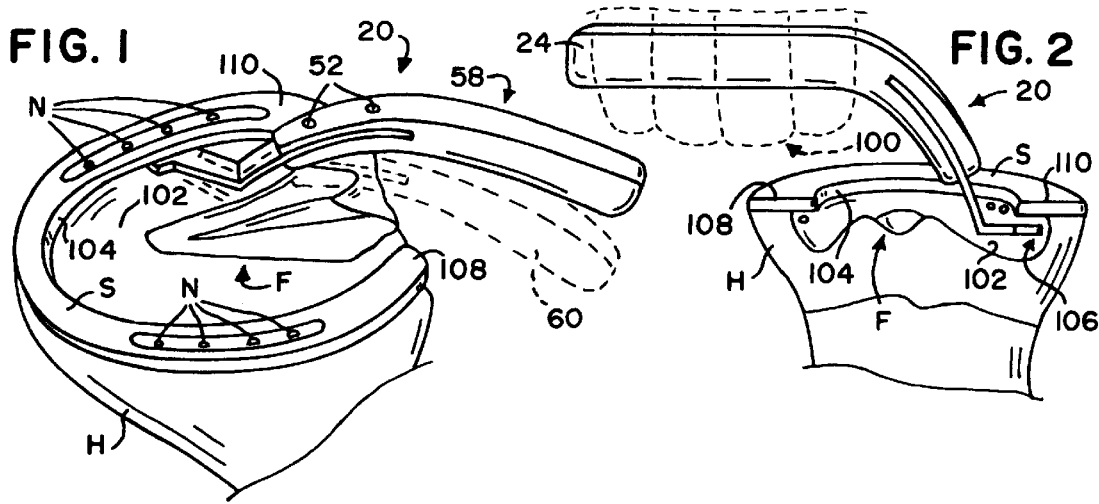
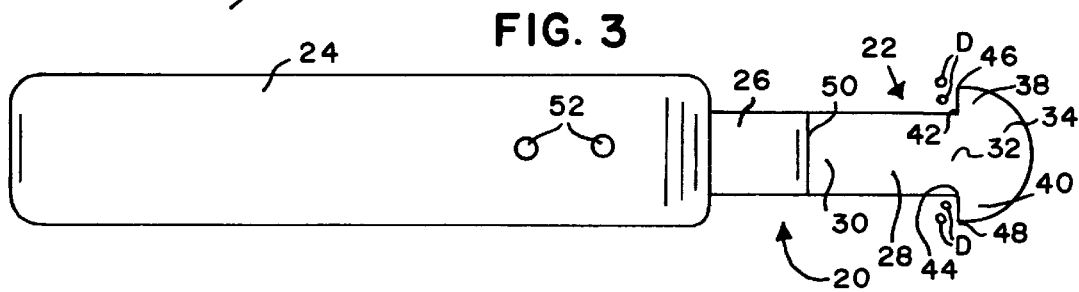
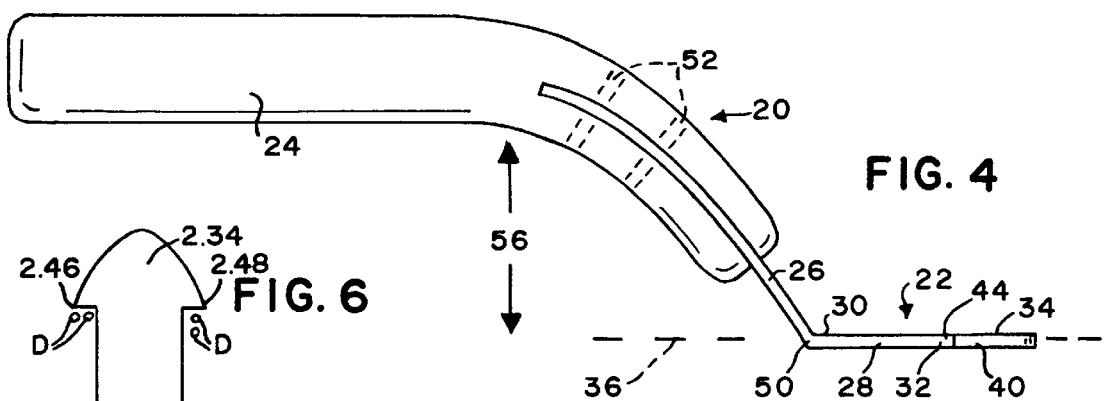
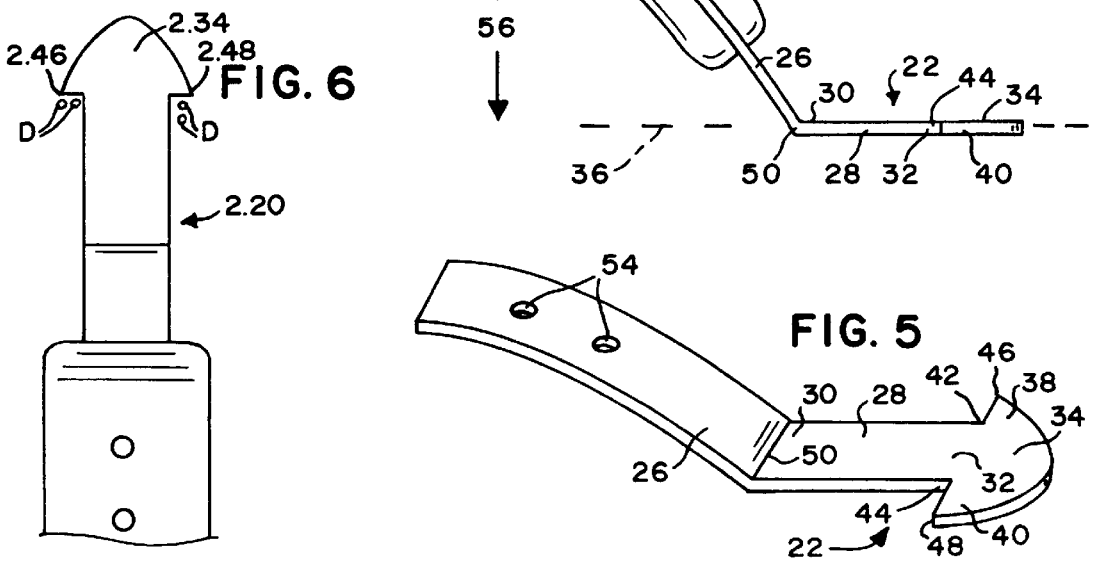

HORSESHOE CLEANING TOOL AND METHOD OF USING

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO A "MICROFICHE APPENDIX"

Not applicable.

BACKGROUND OF THE INVENTION

1. Field of the Invention

The present invention relates, in general, to tools for the care of equine animals, and in particular, to tools for cleaning the hooves of horses and other equine animals.

2. Information Disclosure Statement

A horse's hoof typically has a concave sole on its underside. When a horseshoe is secured by nailing to the hoof's outer wall, the inner edge of the horseshoe does not seat well against the concave sole of the hoof under the horseshoe, thereby forming a cavity recess or space between the horseshoe and the concave sole of the hoof. As the horse walks or runs, loose ground surface materials such as dirt, crushed limestone, sand, pebbles, etc., can collect within this cavity recess between the horseshoe and the sole of the hoof, often causing lameness in the horse. This problem is especially acute on modern arena surfaces that are covered by crushed limestone, which penetrates the sole of the hoof into the sensitive tissues thereunder, often creating an abscess within the horse's hoof that causes the horse to become lame.

It is therefore desirable to be able to easily remove these accumulated ground surface materials from the cavity recess between the horseshoe and the sole of the hoof so that lameness of the horse can be prevented, and it is especially desirable to remove the accumulated ground surface materials without the trouble and expense of having to remove the horseshoe from the horse's hoof.

Well-known solutions for this problem include various horseman's knives and hoof picks, but such prior art solutions have been found to be less than optimal.

A preliminary patentability search in Class 168, subclass 48.1, produced the following patents, some of which may be relevant to the present invention: Jones, U.S. Pat. No. 544,540, issued Aug. 13, 1895; Wilbanks, U.S. Pat. No. 547,703, issued Oct. 8, 1895; McCartea, U.S. Pat. No. 567,493, issued Sep. 8, 1896; Simuro etal., U.S. Pat. No. 4,187,607, issued Feb. 12, 1980; Sabol, U.S. Pat. No. 4,367,798, issued Jan. 11, 1983; Tippin, U.S. Pat. No. 5,176,222, issued Jan. 5, 1993; Sapyta, U.S. Pat. No. 5,575,337, issued Nov. 19, 1996; and Pitchford, U.S. Pat. No. 5,636,697, issued Jun. 10, 1997.

None of these references, either singly or in combination, disclose or suggest the present invention.

BRIEF SUMMARY OF THE INVENTION

The present invention is a horseshoe cleaning tool and method for cleaning under a horseshoe shod to a horse's hoof. The tool includes a blade portion having a blade neck with proximal and distal ends, and the blade portion has a substantially thin and planar tip portion adjacent the blade neck distal end. The tip portion has left and right wing-type extensions each extending laterally outward within the plane of the tip portion and respectively having a left and a right pointed tip remote from the blade neck. The left and right wing-type extensions respectively form left and right notches of about 90 degrees adjacent the blade neck distal end, and the tip portion is substantially rounded intermediate the left and right pointed tips. The tool has a handle grip spaced from the plane of the tip portion, and a blade mounting segment extends upwardly and rearwardly from the blade neck's proximal end and joins to the handle grip. The method comprises grasping the handle grip with a hand, raising the horse's hoof above the ground so that the horse's hoof no longer supports the horse, then placing the tip portion of the tool under the horseshoe and between the horseshoe and the horse's hoof, and then moving the handle grip from side to side and forcing debris from under the horseshoe by using the wing-type extensions to engage the debris.

It is an object of the present invention to provide an improved horseshoe cleaning tool and method for cleaning debris under a horseshoe shod to a horse's hoof without the trouble and expense of having to remove the horseshoe from the horse's hoof.

BRIEF DESCRIPTION OF THE SEVERAL VIEWS OF THE DRAWING

FIG. 1 is a perspective view showing the tool of the present invention in use on an upturned horse's hoof.

FIG. 2 is a rear view of an upturned horses hoof showing the tool of the present invention in use thereon, with the user's fingers shown in dotted outline.

FIG. 3 is a top view of the present invention.

FIG. 4 is a side view of the present invention, the view from the other side being a mirror image thereof.

FIG. 5 is a perspective view of the blade portion and blade mounting segment of the present invention, with the handle removed.

FIG. 6 is a partial top view of an alternate embodiment of the present invention, in which the shape of the tip portion of the blade portion is modified.

DETAILED DESCRIPTION OF THE INVENTION

Before describing the structure and use of the present invention, the structure of a horse's hoof will be briefly given in order to appreciate the problems faced by the present invention and the solution provided therefor.

Referring to FIGS. 1 and 2, a horse's hoof H typically has a generally concave sole 102 on its underside, with a so-called "frog" portion F projecting out from the sole 102. When a horseshoe S is shod or secured by a plurality of nails N to the sole around the outer wall, the inner edge 104 of the horseshoe does not seat well against the concave sole 102, thereby forming a cavity recess or space 106 between the horseshoe S and the concave sole 102 of the hoof. As the horse walks or runs, loose ground surface materials and debris D such as dirt, crushed limestone, sand, pebbles, etc., can collect within this cavity recess 106 between the horseshoe S and the sole 102 of the hoof H, often causing lameness in the horse. The present invention allows cleaning of this debris D from the horse's hoof without removing the horseshoe S.

Referring to FIGS. 1–5, the first embodiment of the horseshoe cleaning tool 20 of the present invention is seen to comprise a blade portion 22, a handle grip 24, and a blade mounting segment 26 joining blade portion 22 to handle grip 24.

Blade portion 22 has a blade neck 28, and blade neck 28 has a blade neck proximal end 30 adjacent blade mounting segment 26 and a blade neck distal end 32 that is remote from blade mounting segment 26. Blade portion 22 has a tip portion 34 that is substantially thin and planar and that defines and lies within a first plane 36. The thickness of the tip portion 34 of blade portion 22 should be between about 1/32 and 3/32 inches (about 0.79 to 2.38 mm), and is preferably about 1/16 inch (1.59 mm) in thickness so as to enable tip portion 34 to slide under the horseshoe S and between the horseshoe S and the horse's hoof H. However, for larger horses such as a Clydesdale or draft horse, the larger hooves and horseshoes of such horses may require that the thickness of tip portion 34 be as large as about 1/8 inch (3.18 mm) to accommodate the larger dimensions found with such a horse. It should be understood that if tip portion 34 is made too thick, it will not fit under the horseshoe S and between the horseshoe S and the horse's hoof H. The tool 20 is specifically designed to clean debris D from cavity recess 106, and the peripheral edges of tip portion 34 and of blade neck 28 are preferably not sharpened, thus enabling the blade portion 22 to engagingly catch and remove debris D from under the horseshoe S in a manner as hereinafter described more fully, because it is not the purpose of the tool 20 to cut or trim the sole 102 of the horse's hoof. Preferably, blade neck 28 is similarly thin, preferably also being between about 1/32 and 3/32 inches (about 0.79 to 2.38 mm), preferably about 1/16 inch (1.59 mm) in thickness, and with blade neck 28 preferably also being coplanar with tip portion 34 within first plane 36. As indicated above, for larger horses such as a Clydesdale or draft horse, the larger hooves and horseshoes of such horses may require that the thickness of blade neck 28 be as large as about 1/8 inch (3.18 mm) for mechanical strength of blade neck 28 and to accommodate the larger dimensions found with such a horse.

Tip portion 34 has left and right wing-type extensions 38, 40 that each extend laterally outward within first plane 36, with left and right wing-type flared portions or extensions 38, 40 respectively forming left and right notches 42, 44 adjacent blade neck distal end 32, preferably with left and right notches 42, 44 forming an angle of about 90 degrees at the respective intersection of left and right wing-type extensions 38, 40 with blade neck distal end 32. Left and right wing-type extensions 38, 40 respectively have left and right pointed tips 46, 48 remote from blade neck distal end 32 and blade neck 28, and, as hereinafter explained in greater detail, left and right wing-type extensions 38, 40 engage debris D within notches 42, 44 so as to remove debris D from under the horseshoe S. Tip portion 34 is preferably substantially rounded as shown intermediate left and right pointed tips 46, 48 rather than being sharply pointed.

Blade mounting segment 26 and blade portion 22 preferably are formed from tempered steel or stainless steel, with blade mounting segment 26 preferably joining blade neck proximal end 30 at a planar angle bend 50 and with blade mounting segment 26 curvingly extending upwardly and rearwardly from blade neck proximal end 30 to handle grip 24, thereby allowing blade mounting segment 26 and handle grip 24 to pass above the frog F of horseshoe S when the tip portion 34 of tool 20 is placed under one side of the horseshoe S as best seen in FIG. 2. Handle grip 24 is securely attached to blade mounting segment 26 as by rivets 52 passing through holes 54 in blade mounting segment 26. Handle grip 24 is preferably made of a suitable material such as wood or plastic and preferably has rounded edges for being comfortably gripped by a user's hand. If handle grip 24 is formed of plastic, handle grip may alternatively be molded about blade mounting segment 26 rather than by using rivets 52 to secure handle grip 24 to blade mounting segment 26.

Handle grip 24 extends rearwardly from blade mounting segment 26 substantially parallel to first plane 36, with handle grip 24 being spaced from first plane 36 by a distance 56 of at least about one inch (2.54 cm) so that, when handle grip 24 is grasped by a user's hand with the user's fingers 100 encircling handle grip 24 and the tip portion 34 of tool 20 is placed under one side of the horseshoe S as best seen in FIG. 2, the user's fingers pass over the other side of the horseshoe S without contacting or scraping that other side of the horseshoe S. It should be understood that prior art picks and knives are for cleaning the frog F of the hoof H and the surface of the sole 102 adjacent the frog F, whereas the present invention 20 is for cleaning the cavity recess 106 formed underneath the horseshoe S adjacent the juncture of the horseshoe S and the hoof H and between the horseshoe S and the sole 102 of the hoof H, underneath the inner edge 104 of the horseshoe S from one heel 108 around to the other heel 110 of the horseshoe.

A second preferred embodiment 2.20 of the present invention is shown in FIG. 6, with identifying reference designators marked similarly to the first embodiment, except with the prefix "2.". It shall be understood that many aspects of both embodiments are substantially the same, and only the differences will be treated in detail. The only structural difference between the first and second embodiments is that the tip portion 2.34 of the second embodiment is generally triangular in shape as shown, but it should be noted that the tip portion 2.34 is still rounded, rather than pointed, intermediate left and right pointed tips 2.46 and 2.48.

Referring especially to FIGS. 1 and 2, the method of the present invention comprises the steps of grasping the handle grip 24 of the tool with the fingers 100 of a user's hand, raising the horse's hoof from the ground so that the horse's hoof no longer supports the horse on the ground, then placing the tip portion 34 of tool 20 within cavity recess 106 formed under the horseshoe S and between the horseshoe S and the horse's hoof H, and then moving the handle grip 24 of tool 20 from side to side in an orbitally circular motion (compare position 58 shown in FIG. 1 with changed position 60 shown in FIG. 1) while moving tip portion 34 underneath the inner edge 104 of the horseshoe S from one heel 108 around to the other heel 110 of the horseshoe S and using the pointed tips 46, 48 of the wing-type extensions 38 to engage and remove debris D, which becomes entrapped within notches 42, 44 and is pulled from under horseshoe S as handle grip 24 is moved from side to side in the orbitally circular motion. It should be understood that tool 20 substantially pivots about tip portion 34 with handle grip 24 being positioned at various radial angles while tip portion 34 remains substantially within the same plane 36 under the horseshoe S.

Although the present invention has been described and illustrated with respect to a preferred embodiment and a preferred use therefor, it is not to be so limited since modifications and changes can be made therein which are within the full intended scope of the invention.

I claim:

1. A horseshoe cleaning tool for cleaning under a horseshoe shod to a horse's hoof, said tool comprising:

(a) a blade portion, said blade portion having a blade neck, said blade neck having a blade neck proximal end and a blade neck distal end, said blade portion comprising a substantially thin tip portion adjacent said blade neck distal end; said tip portion being substantially planar and defining a first plane; said tip portion having left and right wing-type extensions each extending laterally outward within said first plane; said left and right wing-type extensions respectively forming a left and a right notch adjacent said blade neck distal end; said tip portion being substantially rounded intermediate said left and right wing-type extensions without having any rearwardly inwardly-directed notch intermediate said left and right wing-type extensions;

(b) a handle grip, said handle grip being substantially spaced from said first plane; and (c) a blade mounting segment joining said blade neck proximal end to said handle grip, said blade mounting segment extending upwardly and rearwardly from said blade neck proximal end to said handle grip.

2. The horseshoe cleaning tool as recited in claim 1, in which said left and said right notches each form an angle of about 90 degrees between said respective left and right wing-type extensions and said blade neck.

3. The horseshoe cleaning tool as recited in claim 1, in which said left and right wing-type extensions respectively have a left and a right pointed tip remote from said blade neck.

4. The horseshoe cleaning tool as recited in claim 1, in which said handle grip is spaced from said first plane by at least about one inch.

5. A method of cleaning debris from under a horseshoe shod to a horse's hoof, said method comprising the steps of:
(a) providing a horseshoe cleaning tool, said horseshoe cleaning tool comprising:
  i. a blade portion, said blade portion having a blade neck, said blade neck having a blade neck proximal end and a blade neck distal end, said blade portion comprising a substantially thin tip portion adjacent said blade neck distal end; said tip portion being substantially planar and defining a first plane; said tip portion having left and right wing-type extensions each extending laterally outward within said first plane; said left and right wing-type extensions respectively forming a left and a right notch adjacent said blade neck distal end;
  ii. a handle grip, said handle grip being substantially spaced from said first plane; and
  iii. a blade mounting segment joining said blade neck proximal end to said handle grip, said blade mounting segment extending upwardly and rearwardly from said blade neck proximal end to said handle grip;
(b) grasping said handle grip of said horseshoe cleaning tool with a hand;
(c) raising the horse's hoof so that said horse's hoof no longer supports the horse; then
(d) placing said tip portion of said grasped horseshoe cleaning tool under the horseshoe and between the horseshoe and the horse's hoof; and then
(e) moving said handle grip of said horseshoe cleaning tool from side to side and forcing the debris from under the horseshoe by using said wing-type extensions to engage the debris.

6. A horseshoe cleaning tool for cleaning under a horseshoe shod to a horse's hoof, said tool comprising:
(a) a blade portion, said blade portion having a blade neck, said blade neck having a blade neck proximal end and a blade neck distal end, said blade portion comprising a substantially thin tip portion adjacent said blade neck distal end; said tip portion being substantially planar and defining a first plane; said tip portion having left and right wing-type extensions each extending laterally outward within said first plane and respectively having a left and a right pointed tip remote from said blade neck; said left and right wing-type extensions respectively forming a left and a right notch adjacent said blade neck distal end; said left and said right notches each forming an angle of about 90 degrees between said respective left and right wing-type extensions and said blade neck; said tip portion being substantially rounded intermediate said left and right pointed tips without having any rearwardly inwardly-directed notch intermediate said left and right pointed tips;

(b) a handle grip, said handle grip being substantially spaced from said first plane; and (c) a blade mounting segment joining said blade neck proximal end to said handle grip, said blade mounting segment extending upwardly and rearwardly from said blade neck proximal end to said handle grip.

7. The horseshoe cleaning tool as recited in claim 6, in which said handle grip is spaced from said first plane by at least about one inch.

8. A method of cleaning debris from under a horseshoe shod to a horse's hoof, said method comprising the steps of:
(a) providing a horseshoe cleaning tool, said horseshoe cleaning tool comprising:
  i. a blade portion, said blade portion having a blade neck, said blade neck having a blade neck proximal end and a blade neck distal end, said blade portion comprising a substantially thin tip portion adjacent said blade neck distal end; said tip portion being substantially planar and defining a first plane; said tip portion having left and right wing-type extensions each extending laterally outward within said first plane and respectively having a left and a right pointed tip remote from said blade neck; said left and right wing-type extensions respectively forming a left and a right notch adjacent said blade neck distal end; said left and said right notches each forming an angle of about 90 degrees between said respective left and right wing-type extensions and said blade neck; said tip portion being substantially rounded intermediate said left and right pointed tips;
  ii. a handle grip, said handle-grip being substantially spaced from said first plane by at least about one inch; and
  iii. a blade mounting segment joining said blade neck proximal end to said handle grip, said blade mounting segment extending upwardly and rearwardly from said blade neck proximal end to said handle grip;
(b) grasping said handle grip of said horseshoe cleaning tool with a hand;
(c) raising the horse's hoof so that said horse's hoof no longer supports the horse; then
(d) placing said tip portion of said grasped horseshoe cleaning tool under the horseshoe and between the horseshoe and the horse's hoof; and then
(e) moving said handle grip of said horseshoe cleaning tool from side to side and forcing the debris from under the horseshoe by using said left and right pointed tips to engage the debris.

\* \* \* \* \*